(No Model.)
F. P. ZIEGLER.
APPARATUS FOR WARMING OR HEATING THE CONSTITUENTS OF CANDY.
No. 501,310. Patented July 11, 1893.
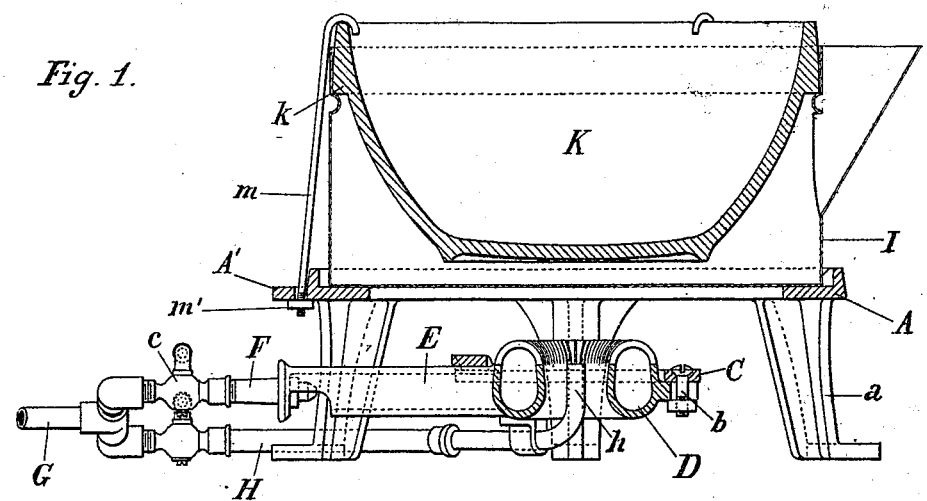
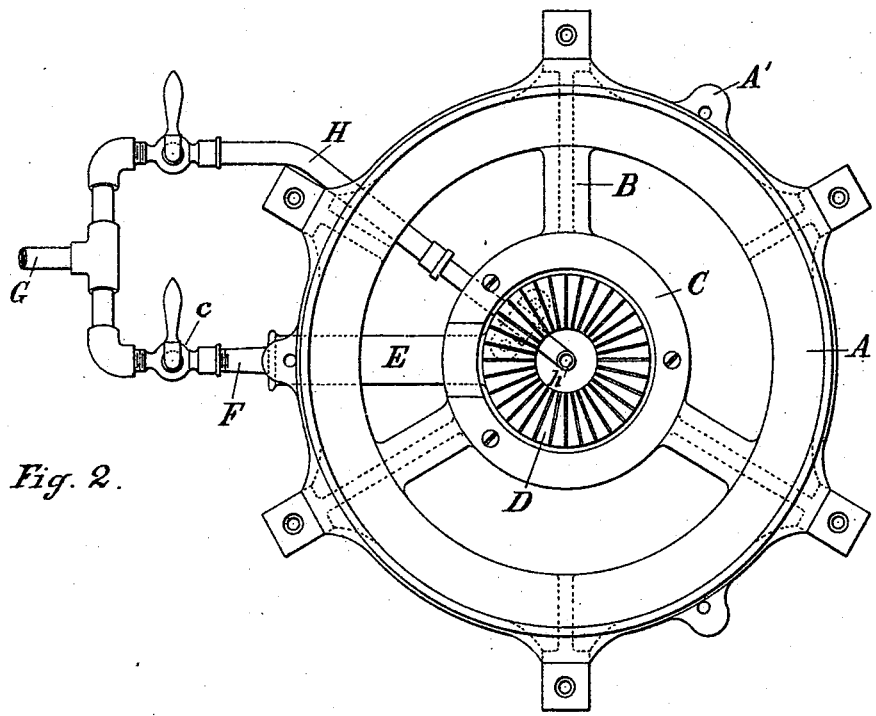
WITNESSES:
INVENTOR
Frank P. Ziegler
BY
ATTORNEY

UNITED STATES PATENT OFFICE.

FRANK P. ZIEGLER, OF MILWAUKEE, WISCONSIN.

APPARATUS FOR WARMING OR HEATING THE CONSTITUENTS OF CANDY.

SPECIFICATION forming part of Letters Patent No. 501,310, dated July 11, 1893.

Application filed January 30, 1892. Serial No. 419,788. (No model.)

*To all whom it may concern:*

Be it known that I, FRANK P. ZIEGLER, of Milwaukee, in the county of Milwaukee and State of Wisconsin, have invented certain new and useful Improvements in Apparatus for Warming or Heating the Constituents of Candy; and I do hereby declare the following to be a full, clear, and exact description of the invention, such as will enable others skilled in the art to which it appertains to make and use the same.

The object of my invention is to provide an apparatus for warming or heating the constituents of candy, in the process of manufacturing it, such as cream for bonbons and the like, which apparatus is of more convenient form, and is better adapted for the purpose above mentioned, than any device heretofore produced.

The apparatus includes a material-holding receptacle having a suitable interior surface of a form to be easily cleaned and to obviate material in it getting into angles or non-accessible places; a kettle for holding the material-containing receptacle adapted to hold water and provided with means for supplying it with water and for inspecting the condition of the water-supply; a suitable frame for supporting the apparatus; and burner devices adapted to provide only such limited amount of heat as serves to slightly warm the contents of the receptacle, or on occasion, to heat that contents to a high degree.

In the drawings, Figure 1, is a vertical central section of my device, and Fig. 2, is a plan of the frame and burners.

The annular frame A is provided with legs *a* preferably cast with it. The frame has also arms B (conveniently cast with it) which project inwardly and downwardly and are rigid to a supporting ring C, which ring in turn supports an annular burner D, secured to and suspended from it by bolts *b*. The arms B, are for convenience, located opposite to alternate legs *a*, and webs between the arms and legs (indicated by dotted lines in the drawings) strengthen the parts. This annular burner D is connected with a fuel supply by a pipe E, and suitable gas connection F, which has a stop cock *c*, and is coupled to a main gas supply pipe G, to which latter is also coupled a small gas pipe H, which with proper connection, leads to a burner *h* which projects through the center of the annular burner D. The annular frame has a peripheral upwardly projecting rim as shown, and also radially projecting perforated ears A'. A kettle I fits and rests within the rim, on the frame, and a bowl K having a circumferential shoulder *k* is suspended in the kettle, its shoulder resting on an internal bead formed in the wall of the kettle, so that its bottom is out of contact with the bottom of the kettle, which latter is intended to hold water through which the heat is imparted to the bowl and its contents. The bowl and kettle are bound firmly to the frame by clamping rods *m* which have hooked upper ends that catch over the edge of the bowl, and lower screw-threaded ends that pass through the ears A', the rods being drawn down by nuts *m'* that bear against the under sides of the ears.

An aperture in the wall of the kettle I, at one side is inclosed and guarded by a nose L, which provides a small compartment or passage adapted for supplying the kettle with water and for the examination of the water supply in the kettle.

The bowl K is preferably earthen ware, and is formed with sloping or curved side walls and bottom, so as to be readily cleaned, and to present no angles in which material can accumulate, and from which it would be removed with difficulty.

In practice, when a very gentle heat is required for merely keeping the water in the kettle warm, the small central burner is used alone, and is regulated by its stop cock to meet the requirements of the case, but when more heat is required, the gas is turned on to the larger burner—which, igniting from the small one, directly gives such greater amount of heat as is required.

The convenience of this apparatus for the purpose stated, will be readily understood. The apparatus being connected to the gas supply by a flexible or detachable pipe, such as is in common use, the apparatus can be conveniently moved about from place to place, or can for discharging its contents or cleaning it, be tipped over on its side, or even inverted. The small single central burner, is sufficiently near the encompassing annular burner that it alone or both burners can be used as desired, the encompassing annular burner having an independent gas supply, being automatically lighted from the smaller burner when gas is turned on to the annular burner. This enables the user to regulate the heat, applied to the outer water-containing dish, while the nose L provides a means for examining the interior of the dish, and for supplying it with water, which is a required medium to protect and properly convey heat to the dish K suspended therein. The annular burner D being located beneath the dish I, centrally, is adapted to give heat to the bottom of the dish, equally distributed about its center.

What I claim as my invention, and desire to secure by Letters Patent, is—

1. A heating apparatus, comprising a suitable frame, a kettle provided with a lateral aperture and a nose forming a passage thereto, which kettle is supported on the frame, a bowl provided with a circumferential shoulder suspended in the kettle, rods clamping the bowl the kettle and the frame rigidly together, and a gas burner mounted on the frame beneath the kettle, substantially as described.

2. In a heating apparatus, an annular frame provided with a circumferential upwardly extending rim and with radially projecting ears, a kettle resting on the frame within the rim, a nose on the side of the kettle forming a passage through an aperture therein into the kettle, a bowl provided with a circumferential shoulder suspended in the kettle, and hooked rods catching on to the top of the bowl above the kettle and secured detachably to the ears of the frame, substantially as described.

In testimony whereof I have signed this specification in the presence of two subscribing witnesses.

FRANK P. ZIEGLER.

Witnesses:
S. S. STOUT,
M. A. DONLEY.